United States Patent [19]
Kurihara et al.

[11] Patent Number: 4,838,397
[45] Date of Patent: Jun. 13, 1989

[54] APPARATUS FOR CONTROLLING VEHICLE HAVING AN AUTOMATIC TRANSMISSION SYSTEM

[75] Inventors: Kazumasa Kurihara; Kenji Arai, both of Higashimatsuyama, Japan

[73] Assignee: Diesel Kiki Co., Ltd., Tokyo, Japan

[21] Appl. No.: 114,950

[22] Filed: Oct. 30, 1987

[30] Foreign Application Priority Data

Nov. 5, 1986 [JP] Japan .................. 61-261820

[51] Int. Cl.$^4$ ............................................. B60K 41/28
[52] U.S. Cl. ................. 192/0.044; 192/0.052; 192/0.09; 192/0.092; 192/3.58
[58] Field of Search ............... 192/0.044, 0.052, 0.055, 192/0.076, 0.09, 0.092, 0.094, 3.58, 3.62

[56] References Cited

U.S. PATENT DOCUMENTS

| | | | |
|---|---|---|---|
| 2,239,182 | 4/1941 | Werder | 74/334 |
| 4,091,902 | 5/1978 | Hamada | 192/0.044 |
| 4,589,532 | 5/1986 | Ito et al. | 192/3.62 |
| 4,662,494 | 5/1987 | Wakiya et al. | 192/0.076 |
| 4,714,145 | 12/1987 | Kurihara et al. | 192/0.052 |

FOREIGN PATENT DOCUMENTS

| | | | |
|---|---|---|---|
| 2387137 | 12/1978 | France | 192/0.055 |
| 60-11756 | 1/1985 | Japan | |
| 60-75735 | 4/1985 | Japan | |
| 60-143140 | 7/1985 | Japan | 192/0.076 |

*Primary Examiner*—Rodney H. Bonck
*Assistant Examiner*—David A. Testardi
*Attorney, Agent, or Firm*—Pollock, Vande Sande & Priddy

[57] ABSTRACT

In an apparatus for controlling a vehicle with an automatic transmission which includes a gear transmission and a clutch and is responsive to the operation of a selector and an acceleration member, the selector has a special position and a low-speed running mode is allowed when the special position is selected. During the low-speed running mode, the vehicle can be driven even when the amount of operation of the acceleration member is zero level, reducing the work of the driver, especially in heavy traffic.

12 Claims, 4 Drawing Sheets

APPARATUS FOR CONTROLLING VEHICLE HAVING AN AUTOMATIC TRANSMISSION SYSTEM

BACKGROUND OF THE INVENTION

The present invention relates to an apparatus for controlling a vehicle having an automatic transmission system, and more particularly to a controlling apparatus for a vehicle having an electronically controlled type automatic transmission system including a gear transmission.

In the conventional control apparatus for a vehicle equipped with an electronically controlled type automatic transmission system employing a gear transmission and a clutch, in order to prevent killing of the engine the clutch is controlled so as to be disengaged when the degree of depression of an accelerator pedal becomes less than a prescribed level and the engine speed is close to its idling speed.

In heavy traffic, however, it is sometimes necessary to drive a vehicle at low speed with the accelerator pedal released, in order to lighten the burden on the driver or to regulate the vehicle speed. This may be possible when the vehicle is in a low gear position because the output torque is large enough to drive the vehicle. However, safety problems may arise if this mode of driving is allowed under all types of operation. On a snowy road, for example, the wheels may spin when the accelerator pedal is depressed to start the vehicle and it may become impossible to get the vehicle moving. In this case, if the clutch does not disengage when the accelerator pedal is released, the wheels will continue to gain and dig more deeply into the snow. As a result, the vehicle will become stuck in the snow.

SUMMARY OF THE INVENTION

It is an object of the present invention to provide an improved apparatus for controlling vehicles, which is capable of eliminating the drawbacks of the prior art.

It is another object of the present invention to provide an apparatus for controlling vehicles, wherein the vehicle can optionally be driven with the accelerator member released.

According to the present invention, in a controlling apparatus for a vehicle having an automatic transmission which includes a gear transmission, a clutch and separate actuating means for actuating the gear transmission and the clutch so as to automatically shift into a target gear position in accordance with at least one operating parameter of the vehicle, the apparatus has a first detecting means for detecting the amount of operation of an acceleration member, a selector means having a special position at which a special ON/OFF control mode of the clutch enables the vehicle to run at low speed even when the degree of operation of the acceleration member becomes not more than a prescribed level, a second detecting means for detecting the selected position of the selector means, a characteristic determining means responsive to at least the first and second detecting means for determining a ON/OFF control characteristic of the clutch, and a controlling means responsive to at least the output of the characteristic determining means for controlling the engaging-/disengaging of the clutch.

When the selector means is positioned at the special position, the control characteristic for the special ON/-OFF control mode of the clutch is selected by the characteristic determining means. Thus, the clutch is controlled in accordance with the selected characteristic so as not to be disengaged even if the degree of operation of the acceleration member become not more than the prescribed level. As a result, the vehicle can be driven with the acceleration member released or with the degree of its operation at not more than a prescribed level. On the other hand, when the selector means is not in the special position, normal control operation is enabled in which the clutch is disengaged in response to, for example, the releasing of the acceleration member (zero depression of the acceleration member).

The above and other objects, features and advantages of the present invention will become more apparent from the following description when taken in conjunction with the accompanying drawings.

DESCRIPTION OF THE PREFERRED EMBODIMENTS

Figure 1:
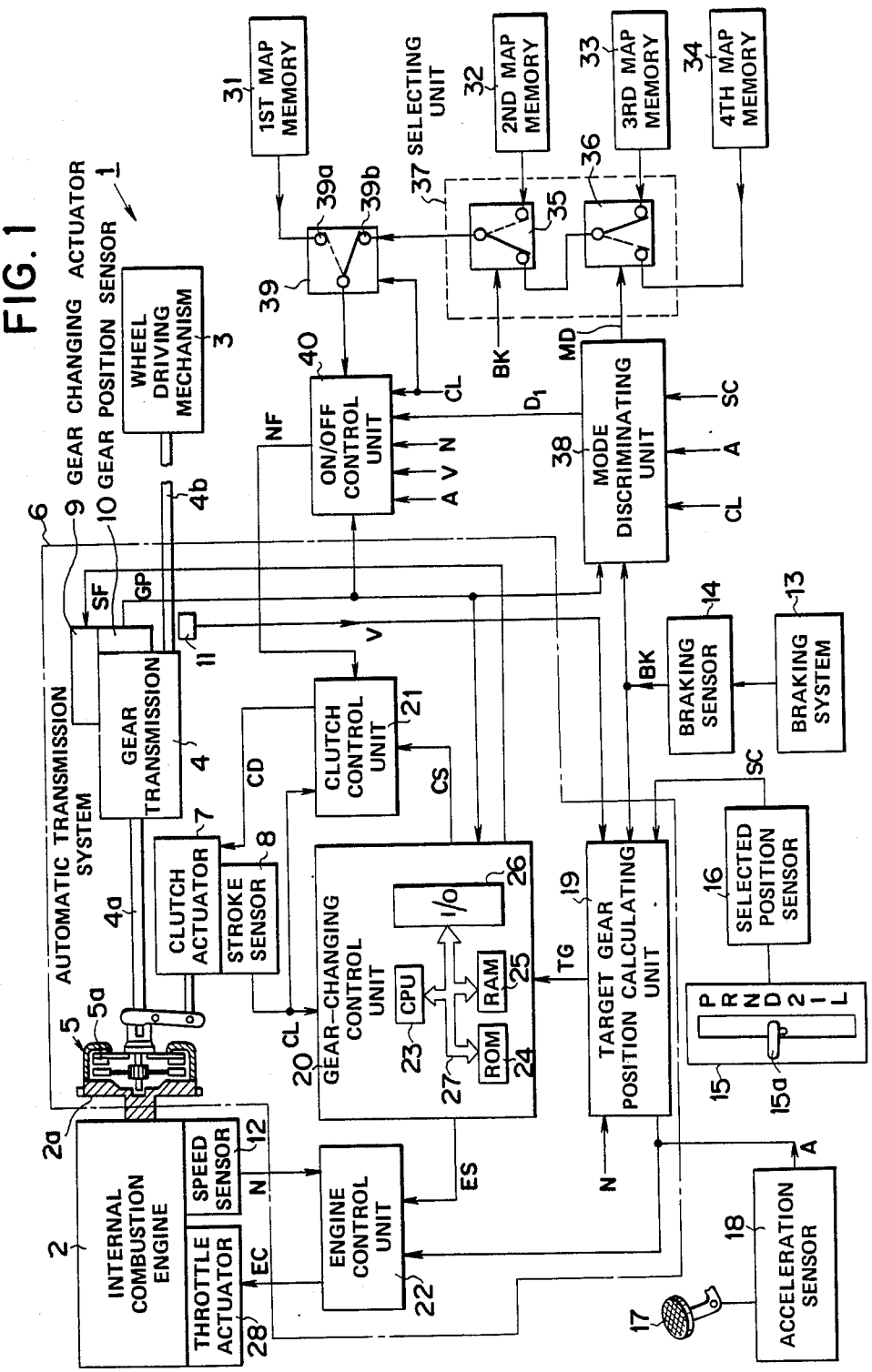
FIG. 1 is a block diagram showing an embodiment of an automatic transmission system according to the present invention, with the clutch shown in cross section.

FIG. 1 is a block diagram showing an embodiment of a controlling apparatus 1 for vehicles according to the present invention. A vehicle (not shown) powered by an internal combustion engine 2 is equipped with an electronically controlled type automatic transmission system 6 which comprises a synchromesh gear type transmission 4 and a friction clutch 5 mounted on an engine flywheel 2a. The transmission 4 is a multi-stage transmission having first to sixth gear forward positions, a reverse gear position and a neutral position. In this embodiment the friction clutch 5 is a well-known dry-type single-disc clutch having a clutch disc 5a. In order to control the engaging/disengaging operation of the clutch 5, there is provided a clutch actuator 7 with a stroke sensor 8 for detecting the position of the clutch disc 5a of the clutch 5 and a clutch signal CL indicating the position of the clutch disc 5a is produced by the stroke sensor 8. The clutch 5 is connected by a connecting rod 4a with the transmission 4. The rotational output of the transmission 4 is transmitted through a propeller shaft 4b to a wheel driving mechanism 3 of the vehicle.

The gear transmission 4 is actuated by a gear changing actuator 9 associated therewith, and the gear position set in the transmission 4 is detected by a gear position sensor 10 associated with the transmission 4 to produce a gear position signal GP showing the set gear position.

The vehicle has a selector 15 with a selecting lever 15a that is manipulated by the driver to select one position from among a plurality of positions which may include, e.g., a "P" position (parking), an "N" position (neutral), a "1" position (1st gear), a "2" position (2nd gear), a "D" position (automatic gear changing position), and an "R" position (reverse gear). The selector 15 further comprises a special "L" position (low speed running position), which enables the vehicle to run in a low-speed running mode in which the vehicle is capable of running at a low engine speed near the idling engine speed even when the degree of the operation of an acceleration member is zero. Thus, the driver may use the selecting lever 15a for selecting the desired operation mode of the transmission 4. The selecting lever 15a is coupled with a selected position sensor 16 for producing a selected position signal SC showing the position of the selecting lever 15a.

An acceleration sensor 18 is associated with an accelerator pedal 17 and produces an acceleration signal A showing the degree of depression of the accelerator pedal 17. Reference numeral 11 indicates a known vehicle speed sensor mounted on the propeller shaft 4b for producing a vehicle speed signal V showing the running speed of the vehicle powered by the engine 2.

A braking system 13 is provided for applying braking power to the vehicle when necessary, and it is detected by a braking sensor 14 whether or not the braking power is applied to the vehicle by the braking system 13. In this specification, the condition where the braking power is applied to the vehicle by the braking system will be referred to as the "brake ON condition or ON condition of the braking system", and the condition where the braking power is not applied to the vehicle by the braking system 13 will be referred to as the "brake OFF condition or OFF condition of the braking system." The braking sensor 14 produces a brake signal BK indicating whether or not the braking system 13 is ON.

Reference numeral 12 is a speed sensor for detecting the speed of the internal combustion engine 2 and producing an engine speed signal N indicating the speed of the engine 2.

The engine speed signal N, the brake signal BK, the selected position signal SC, the vehicle speed signal V and the acceleration signal A are supplied to a target gear position calculating unit 19 which is adapted to produce a target position signal TG showing the target gear position to which the transmission 4 is to be shifted at that time.

The target position signal TG, the clutch signal CL and the gear position signal GP are applied to a gear-changing control unit 20 of well-known design which includes a central processing unit (CPU) 23, read-only memory (ROM) 24, random access memory (RAM) 25 and I/O interface 26, which are interconnected by a bus 27. The input signals TG, CL and GP are converted into digital form in the I/O interface 26 and are processed in accordance with a control program stored in advance in the ROM 24 to produce a shift control signal SF, a clutch control signal CS and an engine control signal ES, which serve to shift the gear transmission 4 into the gear position indicated by the target position signal TG.

The shift control signal SF is applied to the gear changing actuator 9 and controls it so as to shift the gear transmission 4 into the target gear position, while the clutch signal CL and the clutch control signal CS are applied to a clutch control unit 21 for producing a clutch driving signal CD for commanding the engagement or disengagement of the clutch 5. The clutch driving signal CD is for driving the clutch actuator 7 so as to gradually engage or disengage the clutch 5.

The level of the engine control signal ES becomes high when the clutch control signal CS indicates the command for disengaging the clutch 5 during the gear shift operation, and the engine control signal ES is supplied to an engine control unit 22 which also receives the acceleration signal A and the engine speed signal N.

The engine control unit 22 functions to regulate the engine speed based on the manipulation of the accelerator pedal 17. Namely, the engine control unit 22 is responsive to the acceleration signal A to produce an engine speed control signal EC, which is applied to a throttle actuator 28 for controlling the fuel supply to the engine 2. Thus, the throttle actuator 28 is actuated by the engine speed control signal EC in accordance with the degree of depression of the accelerator pedal 17 and the engine speed can be regulated in accordance with the manipulation of the accelerator pedal 17. The above-described operation is performed in the engine control unit 22 only when the level of the engine control signal ES is low.

When the level of the engine control signal ES applied to the engine control unit 22 is high, the engine control unit 22 functions to maintain the engine speed at its idling speed in response to the engine speed signal N. The level of the engine control signal ES is high when the operation for changing gears is being performed, whereby it is possible to suppress increase in engine speed during the gear shifting operation.

Thus, the gear-changing control unit 20 controls the clutch actuator 7, the gear changing actuator 9 and the engine control unit 22 so as to automatically shift the transmission 4 into the target gear position in accordance with the target position signal TG.

Figure 2A:
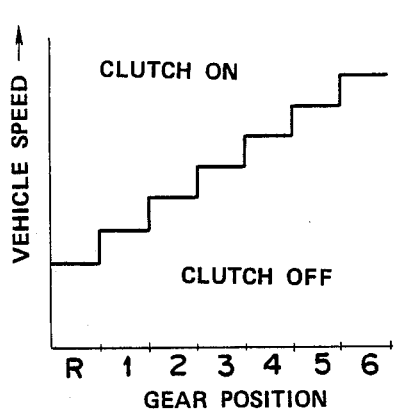
FIGS. 2A to 2D are views showing ON/OFF control characteristics for clutch corresponding to map data stored in the respective map memories of FIG. 1.
Figure 2B:
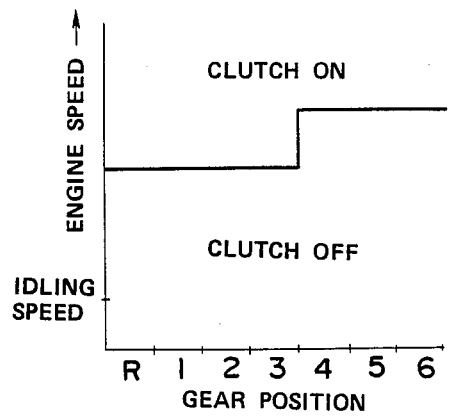
Figure 2C:
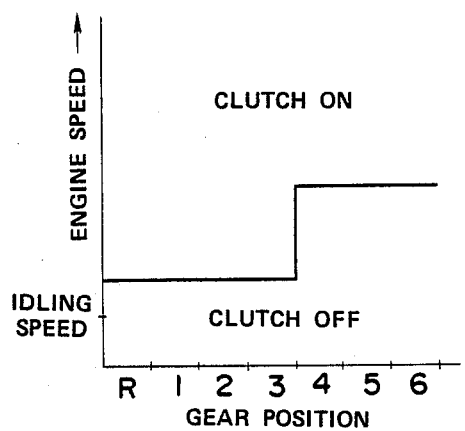
Figure 2D:
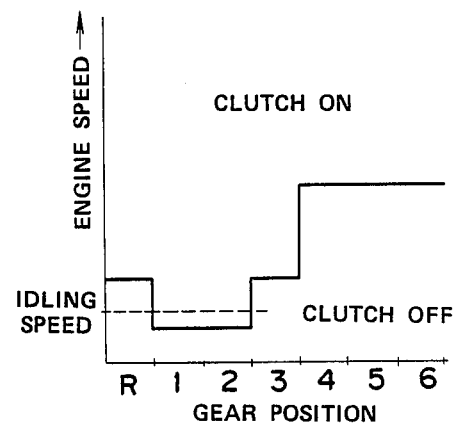

In order to make it possible to determine whether the clutch 5 should be engaged or disengaged in accordance with the gear position of the transmission 4 and the vehicle speed or the engine speed at that time, the apparatus 1 has first through fourth map memories 31 to 34 in which different map data representing ON/OFF control characteristics using gear position and vehicle speed or engine speed as a parameters are stored in advance. First map data is used for determining the condition for changing the clutch 5 from its disengaged (OFF) state to its engaged (ON) state and is stored in the first map memory 31. The first map data represents the characteristics shown in FIG. 2A in which the boundary vehicle speed for changing the clutch 5 from its OFF state to its ON state can be determined in accordance with the gear position. On the other hand, second through fourth map data, which represent the control characteristics for the change of the clutch 5 from its engaged state to its disengaged state, but differ from each other, are stored in the second to fourth map memories 32 to 34. Each of the second through fourth map data represents the characteristics for ON/OFF control of the clutch 5 in which the engine speed and the gear position are used as parameters. In this embodiment, the second map data representing the characteristic shown in FIG. 2B serves to define the condition for disengaging the clutch 5 in the case where the braking power is effected by the braking system. The third map data representing the characteristic shown in FIG. 2C serves to define the condition for disengaging the clutch 5 in a normal operation. The fourth map data representing the characteristic shown in FIG. 2D serves to define the condition for disengaging the clutch 5 in the low speed running mode of the vehicle. As will be understood from FIG. 2D, the clutch 5 is not disengaged in the low speed running mode even when the engine assumes idling speed in the case where the gear transmission 4 is shifted into the first or second gear position.

There is provided a selecting unit 37 which is composed of two switches 35 and 36 to select one of the map data among the second to fourth map data. The switch 35 is controlled by the brake signal BK and the switch 36 is controlled by a mode signal MD from a mode discriminating unit 38 for discriminating whether or not the low speed running mode is to be selected. As a result, one of the map data can be selected among the data stored in the second to fourth map memories 32 to 34 in response to the brake signal BK and the mode signal MD.

The map memory selected by the selecting unit 37 is connected through the selecting unit 37 to a fixed contact 39b of a switch 39 having another fixed contact 39a to which the first map memory 31 is connected. The switch 39 is controlled by the clutch signal CL in such a way that the switch 39 is switched over as shown by the solid line when the clutch signal CL shows the engaged state of the clutch 5 and is switched over as shown by the broken line when the clutch signal CL shows the disengaged state of the clutch 5.

The map data stored in the map memory finally selected by the switch 39 is supplied to an ON/OFF control unit 40, which discriminates whether the clutch 5 is to be engaged or to be disengaged in response to the signals A, V, N, GP, CL and a first signal D1 which will be explained later. An ON/OFF control signal NF showing the result of the discrimination by the ON/OFF control unit 40 is output therefrom and is supplied to the clutch control unit 21.

Figure 3:
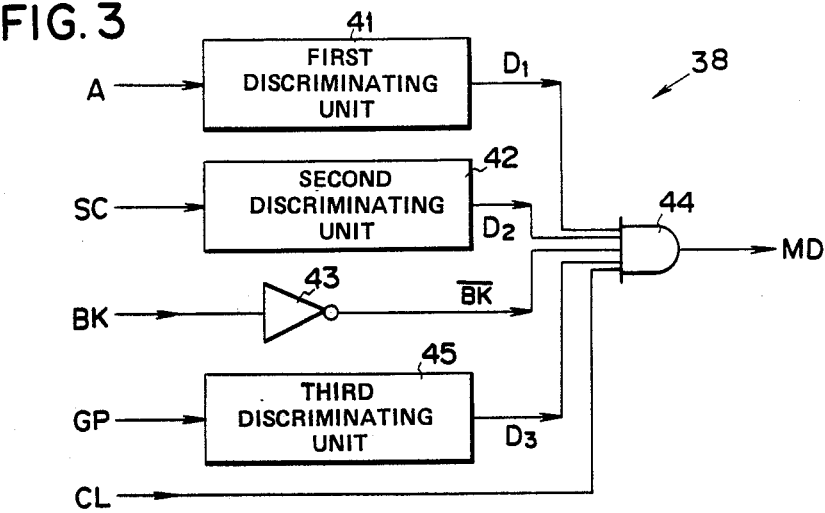
FIG. 3 is a detailed block diagram of the mode discriminating unit shown in FIG. 1.

Referring to FIG. 3, the mode discriminating unit 38 has first to third discriminating units 41, 42 and 45. The first discriminating unit 41 is responsive to the acceleration signal A and functions to discriminate whether or not the amount ACC of operation of the accelerator pedal 17 has become less than or equal to a prescribed low amount Amin and to produce a first signal $D_1$ whose level becomes high only for the condition of ACC≦Amin. The second discriminating unit 42 is responsive to the selected position signal SC and functions to discriminate whether or not the selector 15 is set at the "L" position and to produce a second signal $D_2$ whose level becomes high only when the selector 15 is in the "L" position. The third discriminating unit 45 is responsive to the gear position signal GP and functions to discriminate whether or not the actual gear position of the gear transmission 4 is in either its 1st or 2nd position and to produce a third signal $D_3$ whose level becomes high only when the actual gear position is in its 1st and 2nd position.

The first to third signals $D_1$ to $D_3$ are applied to the respective input terminals of an AND circuit 44 having input terminals to which the clutch signal CL and an inverted brake signal $\overline{BK}$ are applied. The inverted brake signal $\overline{BK}$ is obtained by inverting in level the brake signal BK by means of an inverter 43, and the level of the inverted brake signal $\overline{BK}$ is high when the braking state is OFF since the level of the brake signal BK becomes high in the case where the braking system is ON. The level of the mode signal MD becomes high when all of the levels of the input signals of the AND circuit 44 are high, making the switch 36 to change from the state shown by the solid line to the state shown by the broken line. In this case, if the level of the brake signal BK is low, in other words, if the braking system 13 is in OFF state, the fourth map memory 34 is selected by the selecting unit 37 since the switch 35 is switched over as shown by the solid line.

In this description, the fact that the level of the mode signal MD is high means that the following a conditions (a) to (e) have been satisfied.
 (a) No braking operation has been effected.
 (b) ACC≦Amin
 (c) The selector 15 is in "L" position.
 (d) The transmission 4 is shifted to the 1st or 2nd position.
 (e) The clutch 5 is in its engage condition.

These conditions (a) to (e) are essential for running the vehicle in the low speed running mode. The level of the mode signal MD becomes high when these five conditions (a) to (e) are satisfied, and the fourth map memory 34 is selected by the selecting unit 37.

Figure 4:
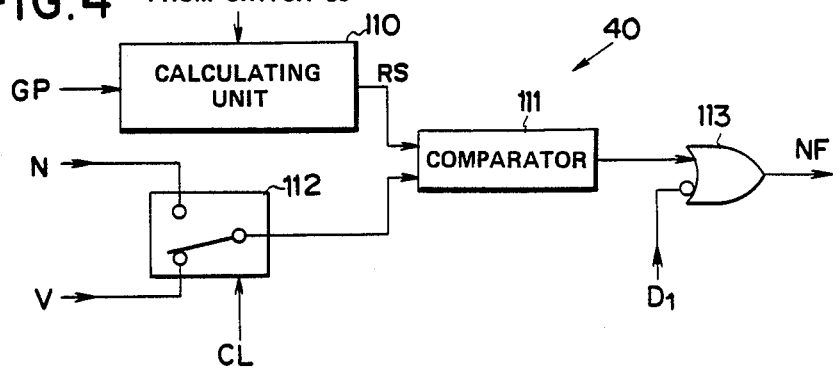
FIG. 4 is a detailed block diagram of the ON/OFF control unit shown in FIG. 1.

FIG. 4 is a detailed block diagram of the ON/OFF control unit 40 shown in FIG. 1. The selected map data from the switch 39 is supplied to a calculating unit 110 to which the gear position signal GP is applied. The calculating unit 110 is for calculating the engine speed or the vehicle speed corresponding to the gear position indicated by the gear position signal GP on the basis of the map data supplied through the switch 39. The result of the calculation in the calculating unit 110 is output as a reference signal RS which is supplied to a comparator 111. A switch 112 receives the engine speed signal N and the vehicle signal V, and one of the signals N or V is selected in response to the clutch signal CL. In this case, the engine speed signal N is selected when the clutch signal CL indicates the ON condition of the clutch 5 and the vehicle speed V is selected when the clutch signal CL indicates the OFF condition of the clutch 5. Thus, it can be detected by the comparator 111 whether or not the engine speed or the vehicle speed at that time is more than the reference speed calculated in the calculating unit 110. The output level of the comparator 111 becomes high when the speed indicated by the output from the switch 112 is more than the reference speed. On the other hand, the output level of the comparator 111 becomes low when the speed indicated by the output from the switch 112 is not more than the reference speed. The output from the comparator 111 is applied to one input terminal of a gate circuit 113 having another input terminal to which the first signal $D_1$ is applied. Therefore, the output from the comparator 111 is derived as the ON/OFF control signal NF when the level of the first signal $D_1$ is high. However, when the level of the first signal $D_1$ is low, the level of the signal NF is always high regardless of the level condition of the output of the comparator 111. In summary, the ON/OFF control unit 40 can thus discriminate whether or not the clutch 5 is to be engaged or whether or not the clutch 5 is to be disengaged, and the result of the discrimination is produced as the ON/OFF control signal NF.

The operation of the apparatus 1 will be now explained.

When the vehicle is coasting (moving by its inertia) with the braking system 13 OFF and the clutch 5 disengaged, the switch 39 is in the condition shown by the broken line. In the case where the vehicle speed increases, the operation for engaging the clutch 5 is carried out by the clutch control unit 21 in response to the ON/OFF control signal NF produced by the ON/OFF control unit 40 on the basis of the first map data of the first map memory 31.

When the clutch 5 is engaged as described above, the switch 39 is switched over as shown by the solid line in response to the clutch signal CL. In the case where the braking system 13 is OFF and the accelerator pedal is depressed by more than a predetermined degree during the running of the vehicle, both the switches 35 and 36 are switched over as shown by the solid lines, causing the third map memory 33 to be connected to the ON/OFF control unit 40. Accordingly, in this case, the ON/OFF control signal NF is produced on the basis of the third map data.

When the amount of operation of the accelerator pedal 17 becomes equal to or less than Amin because, for example, the accelerator pedal is released in the case when the selector 15 is in the "L" position, if the conditions (a) and (d) are satisfied, the level of the mode signal MD becomes high and the disengaged state of the clutch 5 is established in accordance with the fourth map data of the fourth map memory 34. In this embodiment, the fourth map data represents a condition where the clutch 5 is commanded to be engaged unless the engine speed becomes lower than a prescribed low speed lower than the idling engine speed even if the degree of depression of the accelerator pedal 17 becomes equal to or less than a prescribed level. Consequently, even when the accelerator pedal 17 is released, the engine 2 is kept operating at near the idling speed, enabling the vehicle to be driven in a low speed running mode. In this case, if the braking power is applied to the vehicle by the braking system 13 in response to depression of the brake pedal (not shown), the switch 35 is switched over as shown by the broken line. Therefore, the ON/OFF control unit 40 operates on the basis of the second map data and the clutch 5 is disengaged when the accelerator pedal 17 is released.

On the other hand, since the level of the mode signal MD is low in the case where the selector 15 is in a position other than the "L", the switch 36 is switched over as shown by the solid line, and the engaging/disengaging operation of the clutch 5 is controlled on the basis of the third map data. Thus, the clutch 5 is disengaged when the accelerator pedal 17 is released.

As will be understood from the foregoing description, in the apparatus 1 according to the present invention, the clutch 5 is disengaged immediately when the degree of depression of the accelerator pedal 17 becomes equal to or less than Amin in the case where the selector 15 is in a position other than the "L." In contrast, the clutch 5 is not disengaged immediately when the degree of depression of the accelerator pedal 17 becomes equal to or less than Amin in the case where the selector 15 is in the "L" position, so that the low speed running mode can be performed. Accordingly, when the vehicle is running on snow, if the "R" or "1" position is selected, the clutch 5 is disengaged when the accelerator pedal is released and this enables the vehicle to avoid becoming stuck. On the other hand, when the "L" position is selected by the selector 15, since it becomes possible to drive the vehicle at low speed under a certain condition even if the accelerator pedal is released, the work of the driver can be considerably lightened, especially in heavy traffic.

Figure 5:
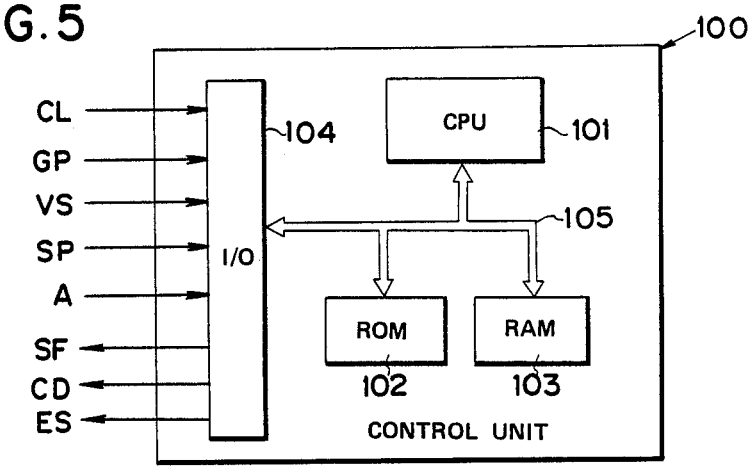
FIG. 5 is a block diagram showing a vehicle controlling apparatus which uses a microcomputer to perform the same vehicle control function as the control apparatus of FIG. 1.

The functions of the vehicle control apparatus 1 may also be realized by the use of a single microcomputer, and such a vehicle control apparatus 100 is shown in FIG. 5.

The vehicle control apparatus 100 shown in FIG. 5 is a microcomputer system for performing the functions of the apparatus 1 of FIG. 1. The apparatus 100 has a central processing unit (CPU) 101, a read-only memory (ROM) 102, a random access memory (RAM) 103 and an I/O interface 104, which are interconnected by a bus 105. The gear position signal GP, the selected position signal SC, the vehicle speed signal, acceleration signal A, the clutch signal CL, the brake signal BK and the engine speed signal N are applied to the I/O interface 44 and a control program stored in the ROM 102 is executed to process these input signals and to output the shift control signal SF, the clutch driving signal CD and the engine control signal ES. In this case, the same data as that stored in the first to fourth map memories 31 to 34 is stored in the ROM 102, and the first map data to the fourth map data are also used in the vehicle control apparatus 100.

Figure 6:
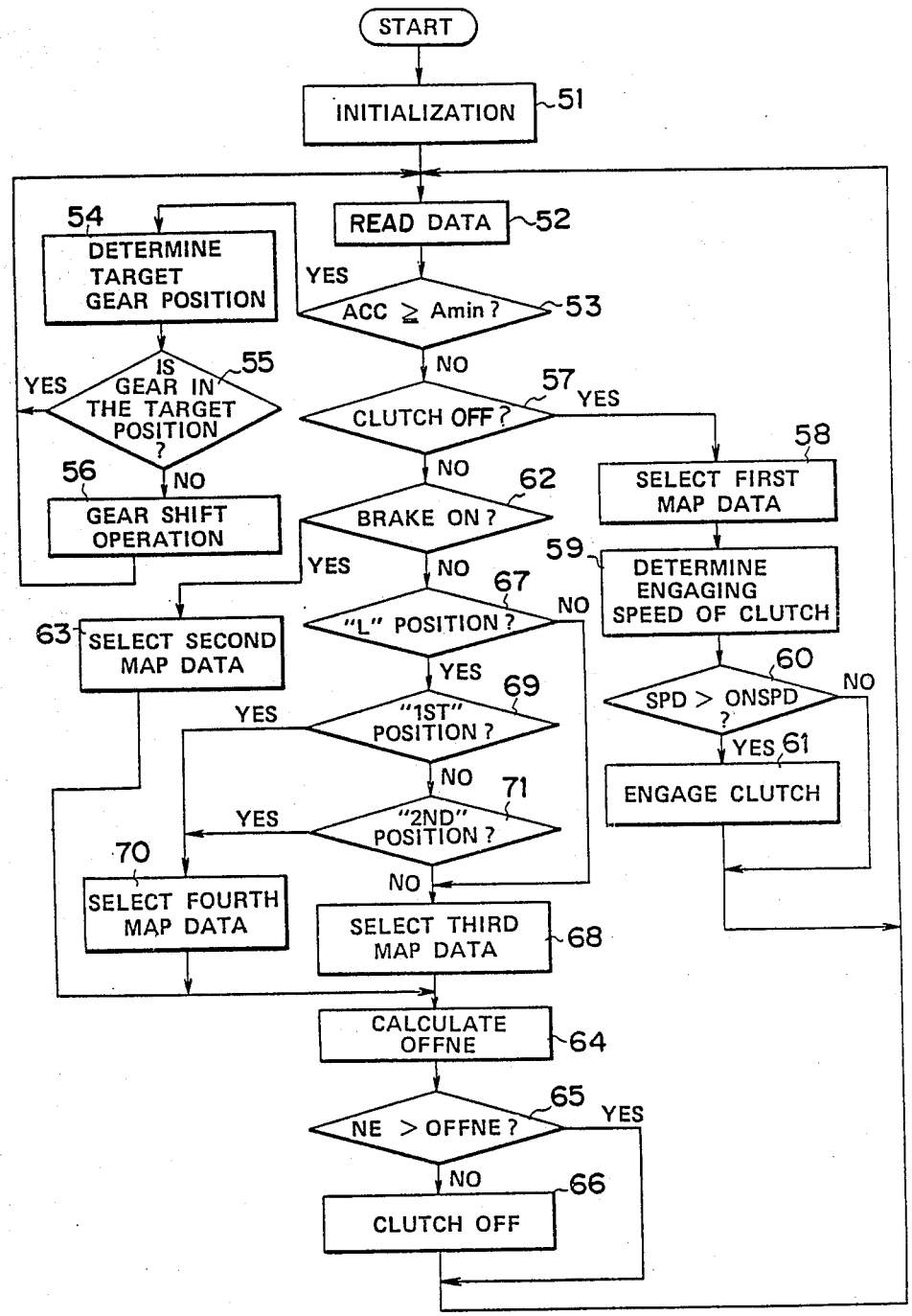
FIG. 6 is a flowchart showing a control program executed in the vehicle control apparatus shown in FIG. 3.

A control program to be executed in the control apparatus 100 is shown in the flowchart of FIG. 6.

After the start of this program, an initialization is executed in step 51 and the necessary input data is read in step 52. After this, a discrimination is made in step 53 on the basis of the acceleration signal A as to whether or not ACC≧Amin. When the determination of step 53 becomes YES, a high speed control operation is carried out by steps 54 to 56. That is, the target or optimum gear position is calculated in step 54 and a discrimination is made in step 55 as to whether or not the actual gear position shown by the gear position signal GP is equal to the target gear position calculated in step 54. When the discrimination in step 55 is NO, gear shift operation is carried out in step 56 and the operation returns to step 52. When the discrimination in step 55 is YES, the operation returns to step 52 without execution of step 56.

When the discrimination in step 53 is NO, i.e. when ACC<Amin, the operation moves to step 57 in which a discrimination is made as to whether or not the clutch 5 is in its disengaged state. When the discrimination in step 57 is YES, the operation moves to step 58 wherein the first map data is selected. After this, the speed for engaging the clutch is determined in accordance with the first map data in step 59. In the following step 60, data showing the vehicle speed SPD at that time is compared with data ONSPD showing the lower limit vehicle speed necessary for performing the engaging operation of the clutch 5. The result of discrimination in step 60 becomes YES when SPD>ONSPD, and the engaging operation of the clutch 5 is executed in step 61. After this, the operation returns to step 52. When the discrimination result in step 60 is NO, the operation returns to step 52 without executing step 61.

When the result in step 57 is NO, the operation moves to step 62 wherein a discrimination is made as to whether or not the braking system 13 is ON. The second map data is selected in step 63 when the discrimination in step 62 is YES. After this, the operation moves to step 64 wherein the value OFFNE, the engine speed when the clutch 5 is disengaged, is determined in accordance with the gear position at that time and the value OFFNE is compared with the engine speed NE at that time in step 65. The discrimination in step 65 becomes YES when NE>OFFNE, and the operation returns to step 52 without the disengagement of the clutch 5. In contrast, the discrimination in step 65 becomes NO when NE≦OFFNE, and in this case the operation returns to step 52 after disengaging the clutch 5 in step 66.

Since the discrimination in step 62 becomes NO when the braking system 13 is OFF, the operation moves to step 67 wherein a discrimination is made as to whether or not the selector 15 is in the "L" position. When the discrimination in step 67 is NO, step 68 is executed to select the third map data. After this, steps 64 to 66 are executed on the basis of the third map data.

When the discrimination in step 67 is YES, the operation moves to step 69 wherein a discrimination is made as to whether or not the gear transmission 4 is in the 1st position, and the operation moves to step 70 when the result in step 69 is YES. The fourth map data is selected in step 70 and the vehicle is driven in the low-speed running mode. When the discrimination of step 69 is NO, the operation moves to step 71 wherein a discrimination is made as to whether or not the gear transmission 4 is in the 2nd position. The operation moves to step 70 when the discrimination in step 71 is YES and moves to step 68 when the discrimination in step 71 is NO.

In summary, a discrimination is made in step 67 as to whether or not the selector 15 is in the "L" position when the braking system 13 is OFF. When the discrimination of step 67 is YES, it is discriminated in steps 69 and 71 whether or not the transmission 4 is in the 1st or 2nd gear position and the low-speed running mode is allowed only when the transmission 4 is in the 1st or 2nd position.

We claim:

1. An apparatus for controlling a vehicle having an automatic transmission which includes a gear transmission, a clutch and separate actuating means for actuating said gear transmission and said clutch so as to automatically shift said transmission into a target position in response to at least one operation parameter of the vehicle, said apparatus comprising:
   a first detecting means for detecting the amount of operation of an acceleration member;
   a selector means having a special position for enabling said clutch to be controlled in a special ON/OFF control mode in which the vehicle can be driven so as to run at low speed even when the amount of operation of the acceleration member becomes not more than a prescribed low level;
   a second detecting means for detecting a position selected by said selector means;
   a first discriminating means responsive to said first detecting means for discriminating whether or not the amount of operation of the acceleration member is no more than the prescribed low level;
   a second discriminating means responsive to said second detecting means for discriminating whether or not said selector means is in the special position;
   a third discriminating means for discriminating whether or not the transmission is shifted into a predetermined position;
   a first determining means responsive to said first through third discriminating means for determining whether or not the vehicle should be run at low speed even when the amount of operation of the acceleration member becomes not more than the prescribed level;
   memory means for storing a plurality of sets of data corresponding to different characteristics for ON/-OFF controlling of said clutch;
   a selecting means responsive to said first determining means for selecting a set of data from said plurality of sets of data stored in said memory means; and
   a control means for controlling the engaging/disengaging of said clutch in accordance with the set of data selected by said selecting means such that said clutch is engaged in accordance with said selected set of data in order to operate said vehicle at a low speed when said selector means is in said special position, when said transmission is shifted into said predetermined position and when the amount of operation of said acceleration member is not more than said prescribed low level.

2. An apparatus as claimed in claim 1 wherein the prescribed low level is zero level.

3. An apparatus as claimed in claim 1 wherein the determination is allowed or disallowed depending on a vehicle braking condition.

4. An apparatus as claimed in claim 1 wherein said memory means has two data sets, one defining characteristics for controlling engagement of said clutch and the other defining characteristics for controlling disengagement of said clutch.

5. An apparatus as claimed in claim 4 wherein said other data set includes at least three data sets, a first set defining characteristics for controlling said clutch during normal driving of the vehicle, a second set for defining characteristics for controlling said clutch at the time a braking power is applied to the vehicle, and the third set defining characteristics for controlling said clutch in the special ON/OFF control mode.

6. An apparatus as claimed in claim 5 wherein the third set defines characteristics whereby said clutch does not disengage even when an engine assumes its idling speed in the case where said transmission is in said predetermined position.

7. An apparatus as claimed in claim 6 wherein the predetermined position is first or second gear position.

8. An apparatus as claimed in claim 5 wherein said selecting means selects one of said data sets in response to an output of said first means, a signal indicating the braking condition of the vehicle and a signal indicating the engaged/disengaged state of said clutch.

9. An apparatus as claimed in claim 4 wherein each of said data sets is map data indicating a relationship among the gear position, a value relating to engine speed and the engaged/disengaged state of said clutch.

10. An apparatus as claimed in claim 1 wherein the ON/OFF control characteristic define a boundary engine speed between the disengaged state and engaged state of said clutch for each gear position.

11. An apparatus as claimed in claim 10 wherein said control means has a calculating means for calculating the boundary engine speed in response to an output of said selecting means and a signal indicating the gear position at that time and means for comparing the calculation result of said calculating means with a signal indicating engine speed.

12. An apparatus as claimed in claim 1, wherein said low speed corresponds to an engine speed greater than the idling engine speed.

* * * * *